(12) United States Patent
Kottapalli et al.

(10) Patent No.: US 7,496,732 B2
(45) Date of Patent: Feb. 24, 2009

(54) METHOD AND APPARATUS FOR RESULTS SPECULATION UNDER RUN-AHEAD EXECUTION

(75) Inventors: Sailesh Kottapalli, San Jose, CA (US); Richard W. Goe, Santa Clara, CA (US); Youngsoo Choi, Dublin, CA (US)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 10/739,686

(22) Filed: Dec. 17, 2003

(65) Prior Publication Data

US 2005/0138332 A1 Jun. 23, 2005

(51) Int. Cl.
*G06F 9/38* (2006.01)
(52) U.S. Cl. .................................... 712/207
(58) Field of Classification Search ............... 712/207; 711/214
See application file for complete search history.

(56) References Cited

U.S. PATENT DOCUMENTS 6,944,754 B2 * 9/2005 Zilles et al. .............. 712/233

OTHER PUBLICATIONS

Sodani et al., "Dynamic Instruction Reuse", Proceedings of the 24th annual international symposium on Computer architecture ISCA '97, vol. 25, Issue 2, May 1997, ACM, pp. 184-205.*
Balasubramonian et al., "Dynamically allocating processor resources between nearby and distant ILP", IEEE, Proceedings of the 28th Annual International Symposium onComputer Architecture, Jun. 30-Jul. 4, 2001, pp. 26-37.*
Purser et al., "A study of slipstream processors", MICRO-33. Proceedings of the 33rd Annual IEEE/ACM International Symposium on Microarchitecture, Dec. 10-13, 2000, pp. 269-280.*

* cited by examiner

*Primary Examiner*—William M Treat
(74) *Attorney, Agent, or Firm*—Blakely, Sokoloff, Taylor & Zafman LLP

(57) ABSTRACT

A method and apparatus for using result-speculative data under run-ahead speculative execution is disclosed. In one embodiment, the uncommitted target data from instructions being run-ahead executed may be saved into an advance data table. This advance data table may be indexed by the lines in the instruction buffer containing the instructions for run-ahead execution. When the instructions are re-executed subsequent to the run-ahead execution, valid target data may be retrieved from the advance data table and supplied as part of a zero-clock bypass to support parallel re-execution. This may achieve parallel execution of dependent instructions. In other embodiments, the advance data table may be content-addressable-memory searchable on target registers and supply target data to general speculative execution.

20 Claims, 7 Drawing Sheets

| | REGULAR EXECUTION | |
|---|---|---|
| 21 | (p20) ld r30, [50] | x-2 (L2 miss) |
| 22 | (p30) add r70 <- r30,r60 | x |
| 23 | (p0) ld r60 <- [80] | x (L1 hit) |
| 24 | (p0) add r50 <- r60,r80 | x+2 |
| 25 | (p30) ld r90 <- [50] | x+3 (L1 hit) |
| 26 | (p0) sub r10 <- r90,r80 | x+5 |

FIG. 3A

| | RE-EXECUTION | |
|---|---|---|
| 22 | (p30) add r70 <- r30,r60 | x |
| 23 | (p0) ld r60 <- [80] | x |
| 24 | (p0) add r50 <- r60,r80 | x |
| 25 | P(30) ld r90 <- [50] | x |
| 26 | (p0) sub r10 <- r90,r90 | x+1 |

FIG. 3B

METHOD AND APPARATUS FOR RESULTS SPECULATION UNDER RUN-AHEAD EXECUTION

FIELD

The present disclosure relates generally to microprocessors, and more specifically to microprocessors capable of run-ahead speculative execution.

BACKGROUND

Modern microprocessors may support run-ahead execution in their architectures. Run-ahead execution is a mechanism of suspending the regular execution of instructions and processing the subsequent instruction stream in a speculative manner. In one important example, run-ahead execution may be entered subsequent to encountering a data-dependency stall. In some implementations, the run-ahead execution supports load boosting (load prefetching) and makes no attempt to utilize any data produced by the run-ahead execution. In other implementations, the run-ahead execution may use data produced during the run-ahead execution and supplied by a bypass network. These results are eventually lost due to the limited depth of the bypass network, and the associated target registers are marked as "poisoned" to avoid launching loads that depend on such poisoned registers. Increasing the depth of the bypass network may make the run-ahead execution more profitable, but at the cost of a greatly increased circuit complexity.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A and 3B are code fragments in regular execution and re-execution, according to one embodiment of the present disclosure.

DETAILED DESCRIPTION

The following description describes techniques for storing data produced by run-ahead execution of instructions, where the data may be subsequently used during re-execution of those instructions. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments the invention is disclosed in the form of an Itanium® Processor Family (IPF) compatible processor such as those produced by Intel® Corporation. However, the invention may be practiced in other kinds of processors, such as in a Pentium® family compatible processor, that may wish to re-use data produced during run-ahead execution during subsequent re-execution.

Figure 1:
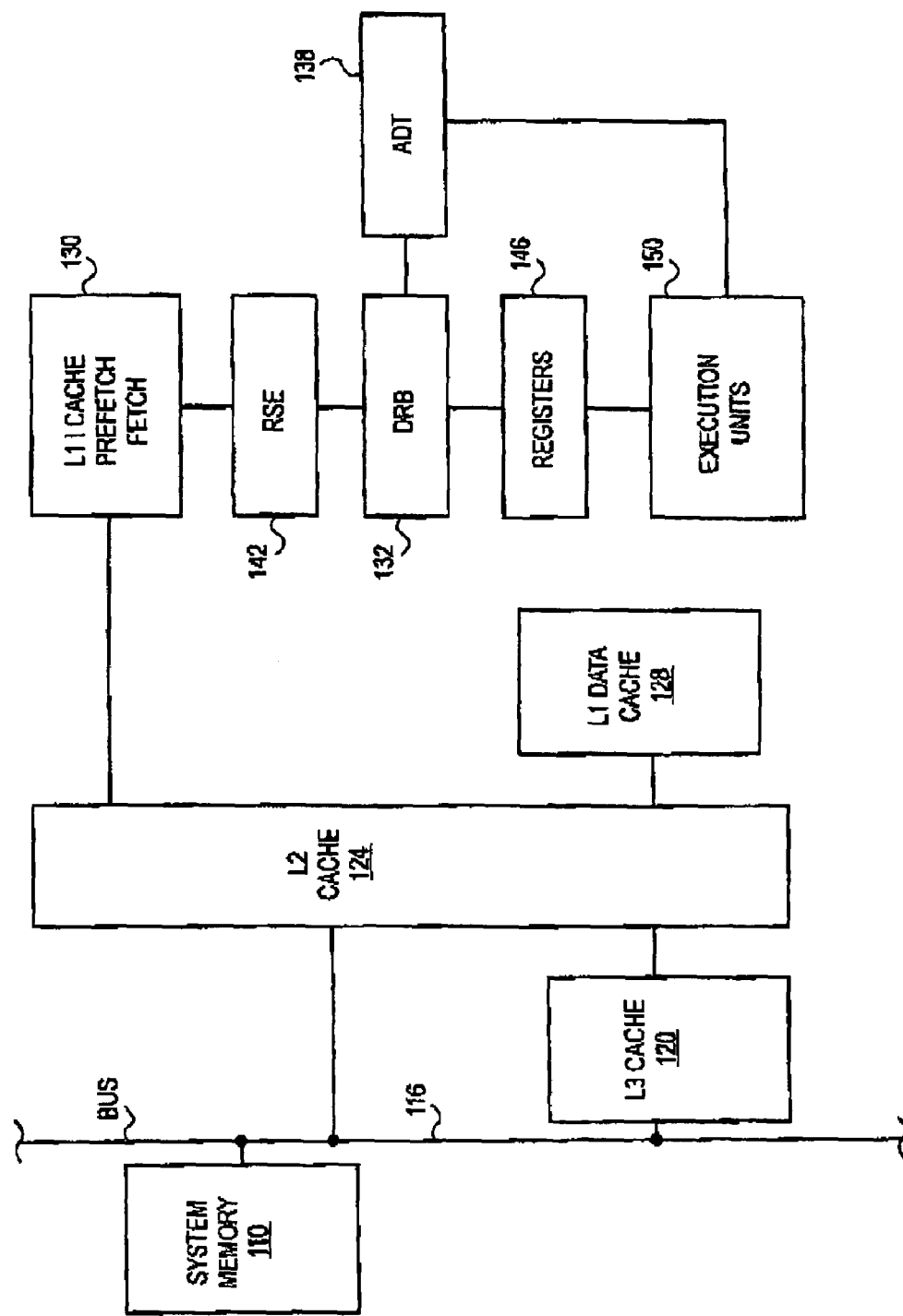
FIG. 1 is a schematic diagram of a processor showing an advance data table, according to one embodiment.

Referring now to FIG. 1, a schematic diagram of a processor including an advance data table is shown, according to one embodiment. The processor may have several levels of cache in addition to a system memory 110. In one embodiment, three levels of cache are show, but in other embodiments differing numbers of cache levels, and interconnections between them, may be used. The FIG. 1 processor includes a level three (L3) cache 120, a level two (L2) cache 124, and separate level one (L1) data cache 128 and L1 instruction cache 130. The L1 instruction cache 130 may also include circuitry to support prefetch and fetch operations.

Instructions that have been fetched may be placed into an instruction buffer. In the FIG. 1 embodiment, the instruction buffer takes the form of a decoupling and replay buffer (DRB) 132. In other embodiments, the instruction buffer may be a re-order buffer (ROB) or other kinds of instruction buffers. The DRB 132 may support run-ahead execution for the processor. In one embodiment, once the instructions in the DRB 132 encounters a data-dependency stall, such as a long-latency cache miss, the subsequent instructions may be issued for speculative execution with certain safeguards against data and load corruption. Once the data-dependency stall is resolved, the processor may clean up the speculative state in the execution pipeline and start the re-execution (replay) of those subsequent instructions from the now-completed instruction at the stall point.

Coupled to the DRB 132 may be an advance data table (ADT) 138. In one embodiment, the ADT 138 may store data for target registers that have not yet been committed. This data may help reduce latency bubbles and enhance the ability to run instructions in parallel during the re-execution process noted above.

The register stack engine (RSE) 142 may act in conjunction with the set of registers 146 to permit the re-allocation of registers required on a per-task (per-function) basis. By allocating registers to a function based upon the requirements of the function, several functions may have their register contents resident within the registers 146 at the same time. The RSE 142 may spill the contents of non-current functions to memory 110 when the physical registers available are fewer than required for a new function.

The execution units 150 may include numerous special-purpose units, such as integer units, floating-point units, branch units, and others. The execution units 150 may get source register data from the registers 146, from the ADT 138, or from a bypass network. A bypass control circuit may determine and select from which of these three sources a given instruction should take its source register data.

Figure 2:
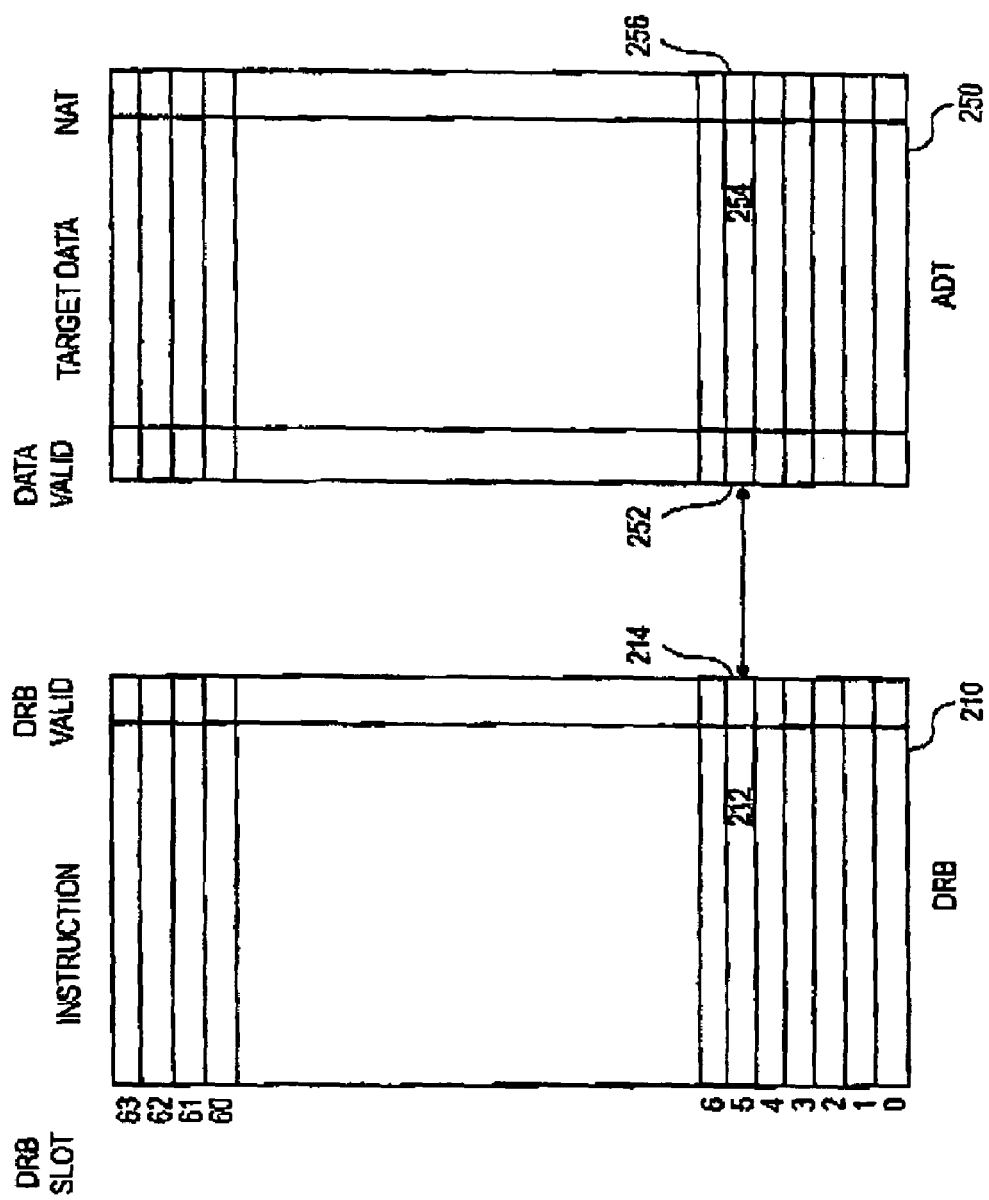
FIG. 2 is a diagram showing an advance data table indexed by a decoupling and replay buffer, according to one embodiment.

Referring now to FIG. 2, a diagram of an advance data table indexed by a decoupling and replay buffer is shown, according to one embodiment. The DRB 210 may in one embodiment store up to 64 instructions, indexed by DRB slot numbers 0 through 63. In other embodiments, other numbers of instructions may be stored. As an example, in DRB slot 5 instruction 212 may be stored. Each instruction in DRB 210 may have a DRB valid bit associated with it. As an example, instruction 212 may have DRB valid bit 214 associated with it. The DRB valid bit may indicate certain aspects of the instruction. In one embodiment, the DRB valid bit may be set if execution of that instruction produced and stored a valid target data in the ADT 250. In addition, the DRB valid bit may be used to control the issuance of instructions for parallel execution during the re-execution. The DRB valid bit being found set invalid may be interpreted as stating that any data dependencies are no longer important, but also to not use any corresponding target data in the ADT 250. In one embodiment, the location of an instruction within the DRB 210 may be maintained until that instantiation of the instruction is de-allocated at retirement.

In order to better support run-ahead execution with DRB 210, the ADT 250 may be used. In one embodiment, the entries in ADT 250 may be indexed by the DRB slot numbers, although in other embodiments other indexing could be used. Each entry in ADT 250 may contain uncommitted target data intended for the target register (destination register) of the associated instruction. For example, in DRB slot 5 in the ADT 250, target data 254 intended for the target register of instruction 212 may be stored. Each entry may also include a data valid bit and a not-a-thing (NAT) bit. In one embodiment, the data valid bit may be derived in part from the poisoned bits of the corresponding instruction's source registers. The data valid bit may also be derived in part from the validity state of the instruction's associated predicate register. Here the status of poisoned may indicate that the register may have a data dependency that is not currently satisfied. In other embodiments the data valid bit may be set by other data validity metrics. The data valid bit may be used to control data bypassing during the non-speculative (e.g. re-execution) mode. In one embodiment, the NAT bit may indicate the presence of a deferred exception.

The instructions that have produced valid target data placed into the ADT 250 may also be re-executed during the re-execution. The target data generated during the re-execution may be compared with the target data stored previously in the ADT 250. In those cases where the target data in the ADT 250 does not match the results of current re-execution, any instructions that consumed the target data from the ADT 250 may be trapped and re-executed. In other words, the advance target data is not guaranteed to be correct, but the correctness is verified during the re-execution process.

Referring now to FIGS. 3A and 3B, code fragments in regular execution and re-execution are shown, according to one embodiment of the present disclosure. (Instructions are shown with target registers preceding the <-symbol, and source registers following the <-symbol.) FIG. 3A is a table with the first column indicating the DRB slot number, the second column the instruction, and the third column the relative clock cycle during execution. For this example, let the load latency from the L1 cache be 2 clock cycles. The load instruction in slot 21 during regular execution misses not only in the L1 cache but also in the L2 cache, indicating considerable latency for the load to complete to register r30. This doesn't in itself create a stall situation until a subsequent instruction attempts to source data from r30. This occurs with the add instruction in slot 22. The processor therefore initiates run-ahead execution starting with the add instruction in slot 22. The instructions in slots 21 and 22 may not store target data in the ADT due to their unsatisfied data dependency. However, the instructions in slots 23, 24, 25, and 26 may store data in the ADT since the load instructions, in this example being hits in the L1 cache, have sufficient time to complete in the two clock cycles allocated them. The run-ahead execution may continue in this manner until the load instruction in slot 21 eventually completes.

When the load instruction in slot 21 eventually completes, the instructions that were run-ahead executed, starting with the add instruction in slot 22, need to be re-executed. FIG. 3B, with the columns as defined for FIG. 3A, shows one embodiment of the re-execution. The FIG. 3B embodiment presumes a processor that may issue a maximum of four instructions during the same clock cycle. In other embodiments, other numbers of instructions may be issued during the same clock cycle. During the re-execution in non-speculative mode, the instruction execution profile would be the same as during the run-ahead execution since the two loads in slots 23 and 25 were hits in the L1 cache. The re-execution may begin with the add instruction in slot 22. As in the FIG. 3A example, instruction 23 may be issued in parallel with instruction 22 due to lack of data dependency. Since the load instruction at slot 23 stored its advanced results for r60 in the ADT, the add instruction at slot 24 may also be issued in parallel. Similarly, since the add instruction at slot 24 stored its advanced results for r50 in the ADT, the load instruction at slot 25 may also be issued in parallel. Additional issuance of instructions in parallel are only precluded due to the limit of four instructions capable of being issued in the processor of the present embodiment. However, the sub instruction in slot 26 may be issued only one clock cycle later since the load instruction in slot 25 stored its advanced results for r90 in the ADT. In this example, due to the advanced results being stored in the ADT, the re-execution may take place with zero clock latencies up to the issue limits of the processor. This permitted the re-execution to take only two clock cycles, where the original execution required six clock cycles.

Figure 4:
FIG. 4 is a diagram of an advance data table supporting speculative execution, according to one embodiment of the present disclosure.

The target data entries in the ADT for the FIGS. 3A and 3B example are shown in the enhanced ADT 400 of FIG. 4, the discussion of which follows.

Referring now to FIG. 4, a diagram of an advance data table supporting speculative execution is shown, according to one embodiment of the present disclosure. The ADT 400 of FIG. 4 is similar to that of the FIG. 2 embodiment, with the addition of two new columns to support general speculative execution. In the target register identifier field, an identifier number may be placed to represent the target register of the instruction in the corresponding DRB slot. In the register identifier valid field, a bit may be set valid when the target data in that slot is first entered. The bit may then be set invalid when data targeting the same register is entered for a different instruction in a different slot. This ensures that at most one target data with a register identifier valid field set to valid may be present at a time for a given register. Such a register identifier valid bit may be used to control data bypassing during the speculative (e.g. run-ahead) mode.

In a simple run-ahead execution, the run-ahead execution is limited by the depth of the bypass network. However, once the ADT is populated with speculative results, it may be used to bypass the valid advanced results to any subsequent instructions that consume the target data. During speculative execution, the ADT 400 may be searched 410 as a content-addressable-memory (CAM) on the target register identifier field. Any target data found there with the register identifier valid bit set valid may be used by the consuming instructions. Unlike traditional bypass networks, which may only be extended forward a few instruction clock cycles, receiving the bypass data from the ADT 400 may support consuming instructions separated from the producing instructions by large numbers of instruction clock cycles.

To summarize the derivation and utilization of one embodiment of the various validity bits, the DRB valid bit may be set (valid) when execution of the associated instruction produces and stores valid target data into the ADT. If the DRB valid bit is cleared (invalid), the data dependencies may no longer be valid and any corresponding data in the ADT should not be used. The DRB valid bit may control the issuance of instructions for parallel execution during the re-execution mode. In contrast, the ADT data valid bit may be derived by consideration of the poisoned bits of the corresponding instruction's source registers and, in addition, the value of the predicate register (if any) for the corresponding instruction. The ADT data valid bit may control the data bypassing during the non-speculative (e.g. re-execution) execution mode. Finally, the ADT register identifier valid bit may be set (valid) when the corresponding instruction writes valid data to the corresponding target register, and may be cleared (invalid) when any other instruction writes to that same corresponding target register. The ADT register identifier valid bit may be used to control data bypassing during speculative (including run-ahead) execution mode.

Figure 5:
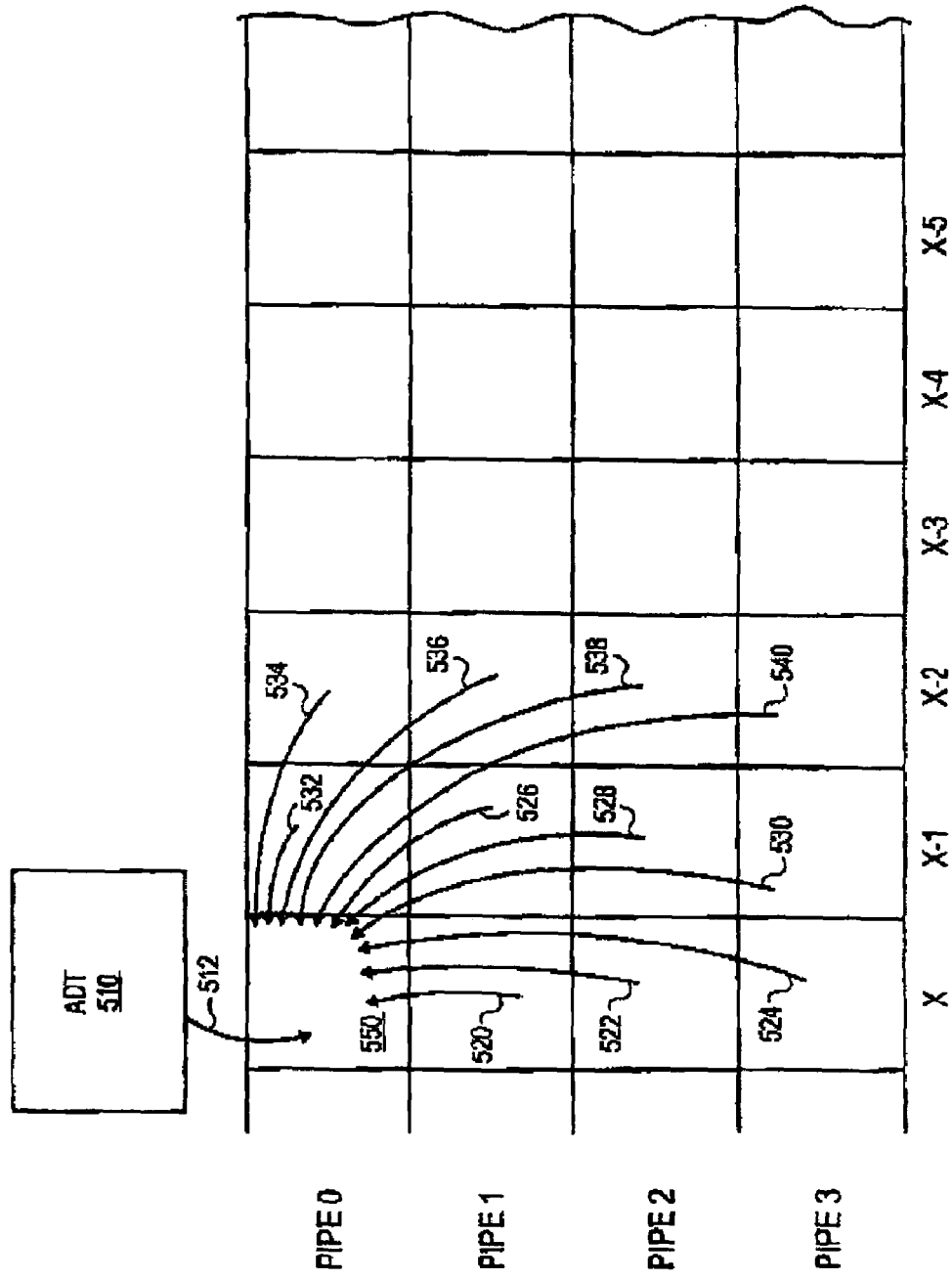
FIG. 5 is a diagram showing bypass paths in a multiple-issue pipeline, according to one embodiment of the present disclosure.

Referring now to FIG. 5, a diagram illustrating bypass paths in a multiple-issue pipeline is shown, according to one embodiment of the present disclosure. The FIG. 5 pipeline may issue up to four instructions during each instruction clock cycle, on paths labeled pipe 0 through pipe 3. When considered in the normal execution order, an instruction to be placed in pipe 0 should be the last instruction normally to be executed. Hence the instruction for execution in pipe 0 needs sideways (zero-clock) bypass paths 520, 522, and 524 as there is the possibility of that instruction being dependent upon the previous 3 instructions. Similarly there should be bypass paths 532, 526, 528, and 530 from the instructions issued one instruction clock cycle earlier, and bypass paths 534, 536, 538, and 540 from the instructions issued two instruction clock cycles earlier. The number of bypass paths may only be limited by considerations of circuit complexity, but this complexity may be prohibitive with extending the bypass network beyond a few pipeline stages.

In contrast with the complexity of the traditional bypass network, using a bypass path 512 from an ADT 510 may support far deeper instruction speculation without the need for extending the bypass network. Target data stored within the ADT 510 may be bypassed into pipe 0 and support consuming instructions that occur at great separation from the producing instructions that wrote target data into the ADT 510. It may be noteworthy that the ADT bypass path 512 may only need to cover those bypass situations not supported by the regular bypass paths. In any case, once real (e.g. non-speculative) data is available in the regular bypass, the speculative ADT bypass data may not be used.

Figure 6A:
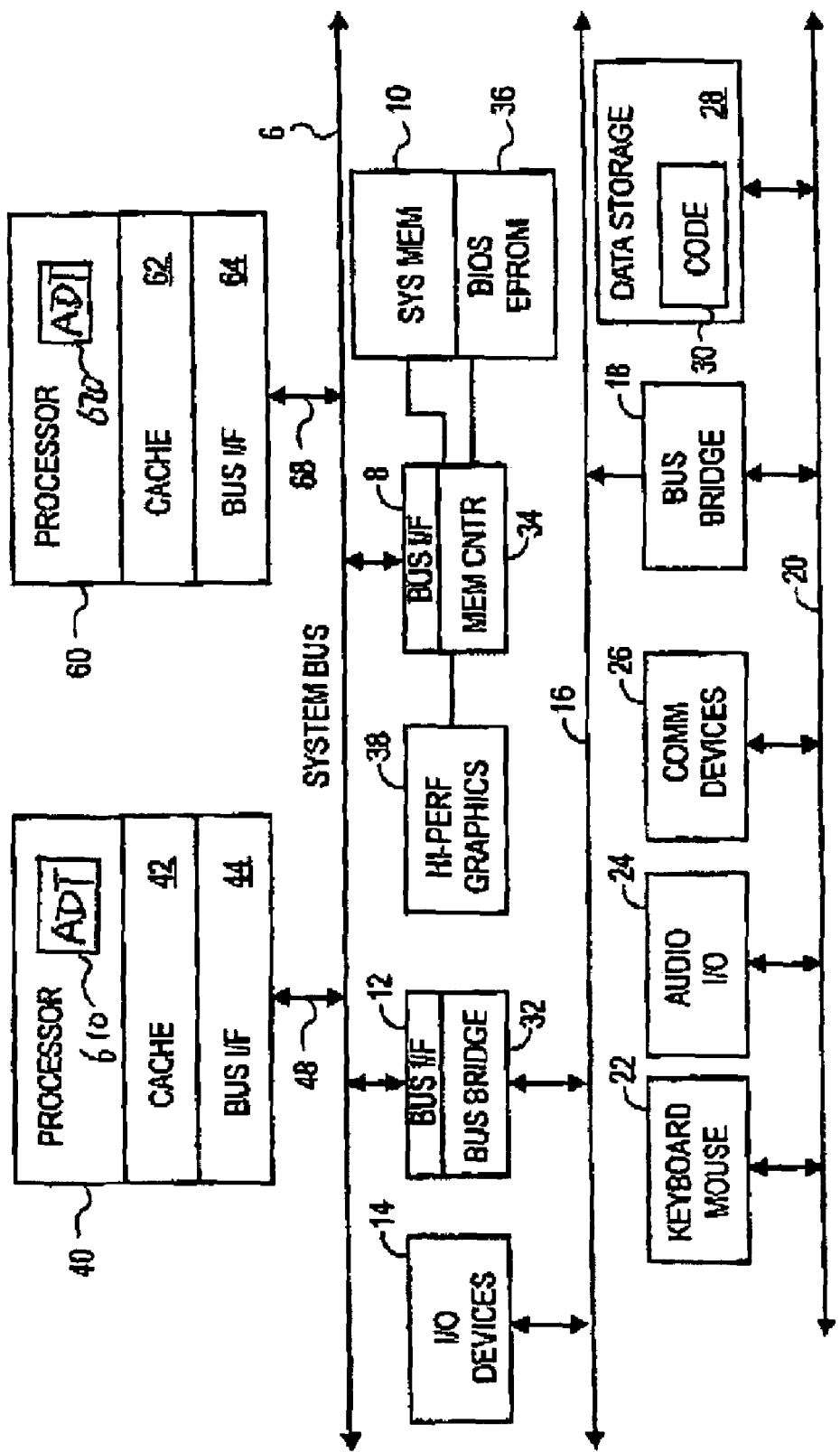
FIGS. 6A and 6B are schematic diagrams of systems including a processor supporting an advance data table, according to two embodiments of the present disclosure.
Figure 6B:
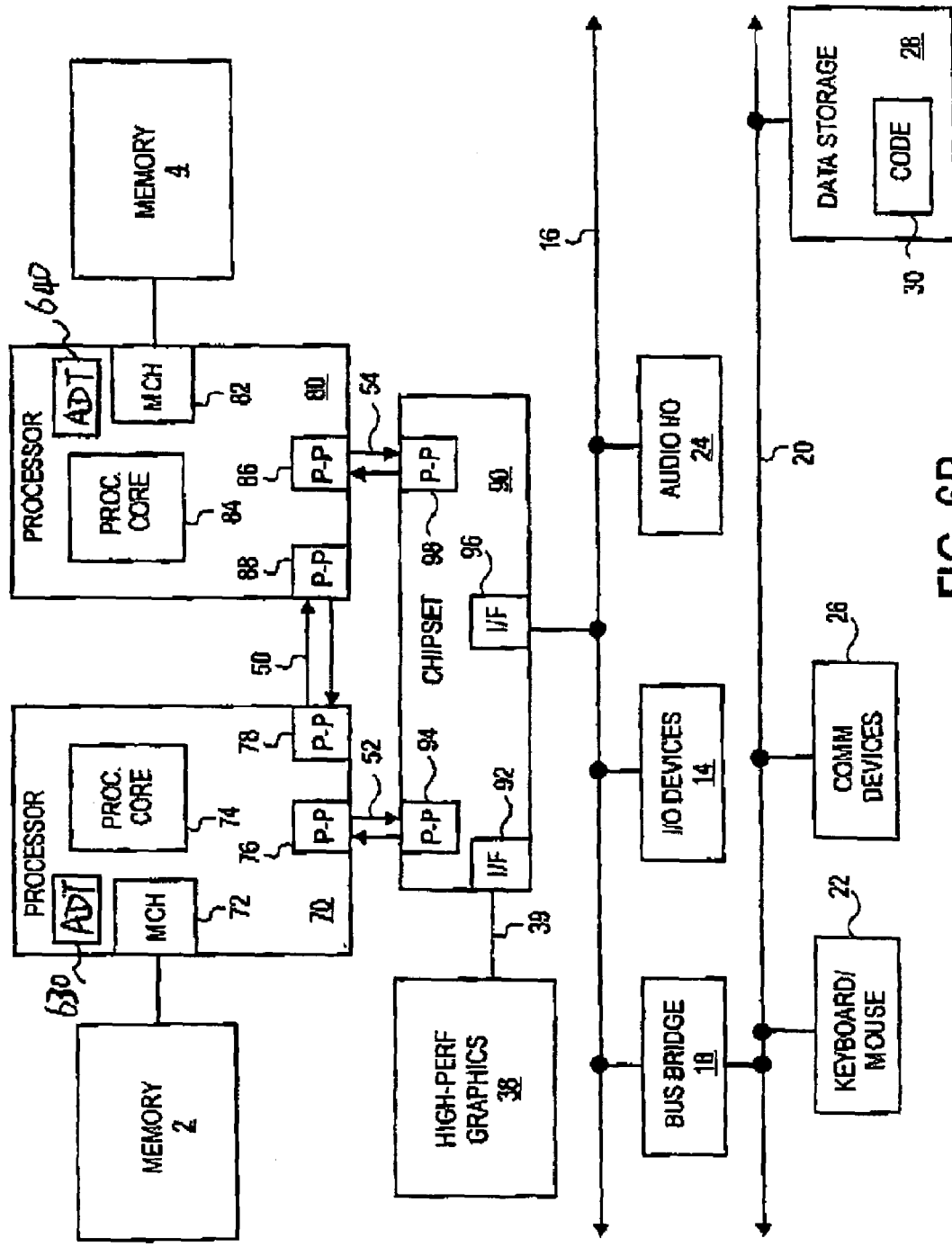

Referring now to FIGS. 6A and 6B, schematic diagrams of systems including a processor supporting an advance data table (shown as 610 and 620 in FIG. 6A, and 630 and 340 in FIG. 6B) are shown, according to two embodiments of the present disclosure. The FIG. 6A system generally shows a system where processors, memory, and input/output devices are interconnected by a system bus, whereas the FIG. 6B system generally shows a system where processors, memory, and input/output devices are interconnected by a number of point-to-point interfaces.

The FIG. 6A system may include several processors, of which only two, processors 40, 60 are shown for clarity. Processors 40, 60 may include level one caches 42, 62. The FIG. 6A system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other busses may be used. In some embodiments memory controller 34 and bus bridge 32 may collectively be referred to as a chipset. In some embodiments, functions of a chipset may be divided among physical chips differently than as shown in the FIG. 6A embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct read data from system memory 10 to the high-performance graphics circuit 38 across high-performance graphics interface 39.

The FIG. 6B system may also include several processors, of which only two, processors 70, 80 are shown for clarity. Processors 70, 80 may each include a local memory controller hub (MCH) 72, 82 to connect with memory 2, 4. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. Chipset 90 may also exchange data with a high-performance graphics circuit 38 via a high-performance graphics interface 92.

In the FIG. 6A system, bus bridge 32 may permit data exchanges between system bus 6 and bus 16, which may in some embodiments be a industry standard architecture (ISA) bus or a peripheral component interconnect (PCI) bus. In the FIG. 6B system, chipset 90 may exchange data with a bus 16 via a bus interface 96. In either system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor, comprising:
   an instruction buffer to hold a plurality of instructions, the instruction buffer to support run-ahead execution of the plurality of instructions;
   an advance data table, indexed by said instruction buffer, to store a set of data for said plurality of instructions during the run-ahead execution, and to supply said set of data to at least one of said plurality of instructions during re-execution, each of said set of data intended for a target register of one of said plurality of instructions, and wherein said advance data table includes a valid bit for each of said set of data derived from poisoned status of source registers of the corresponding instruction, and wherein the advance data table is populated responsive to a cache miss; and
   a pipeline to issue more than one instruction in a single clock cycle during the re-execution when data required by said more than one instruction is either in said advance data table with valid bit being set valid or otherwise available.

2. The processor of claim 1, wherein said advance data table includes a register identifier for a target register associated with each of said set of data.

3. The processor of claim 2, wherein said advance data table includes a searchable register identifier field containing a plurality of register identifiers, each corresponding to one of said set of data.

4. The processor of claim 3, wherein said advance data table includes a register identifier valid bit associated with each of said plurality of register identifiers.

5. The processor of claim 4, wherein said register identifier valid bit is set invalid when an instruction other than the instruction corresponding to said register identifier targets the target register that said register identifier identifies.

6. The processor of claim 4, wherein first data in said set of data that results from a first instruction may be used by a second instruction during speculative execution when a first register associated with said first data is a source register of said second instruction and the register identifier valid bit of said first register is set valid.

7. A method, comprising:
   buffering a plurality of instructions in an instruction buffer supporting run-ahead execution of the plurality of instructions;
   storing a set of data resulting from said plurality of instructions in a table during the run-ahead execution, each of said set of data intended for a target register of one of said plurality of instructions, wherein the table is populated responsive to a cache miss;
   deriving a valid bit for each of said set of data from poisoned status of source registers of the corresponding instruction;
   supplying said set of data to at least one of said plurality of instructions during a re-execution; and
   issuing more than one instruction in a single clock cycle during the re-execution when data required by said more than one instruction is either in said table with valid bit being set valid or otherwise available.

8. The method of claim 7, wherein said storing includes storing a register identifier in said table for a target register associated with each of said set of data.

9. The method of claim 8, further comprising setting a register identifier valid bit invalid when an instruction other than the instruction corresponding to said register identifier targets the target register that said register identifier identifies.

10. The method of claim 8, further comprising consuming first data in said set of data that results from a first instruction by a second instruction during speculative execution when a first register associated with said first data is a source register of said second instruction and the register identifier valid bit of said first register is set valid.

11. A system, comprising:
   a processor including
      an instruction buffer to hold a plurality of instructions, the instruction buffer to support run-ahead execution of the plurality of instructions;
      an advance data table, indexed by said instruction buffer, to store a set of data for said plurality of instructions during the run-ahead execution, and to supply said set of data to at least one of said plurality of instructions during re-execution, each of said set of data intended for a target register of one of said plurality of instructions, and wherein said advance data table includes a valid bit for each of said set of data derived from poisoned status of source registers of the corresponding instruction, and wherein the advance data table is populated responsive to a cache miss;
      a pipeline to issue more than one instruction in a single clock cycle during the re-execution when data required by said more than one instruction is either in said advance data table with valid bit being set valid or otherwise available;
   an interface to couple said processor to input-output devices; and
   an audio input-output coupled to said interface and said processor.

12. The system of claim 11, wherein said advance data table includes a register identifier for a target register associated with each of said set of data.

13. The system of claim 12, wherein said advance data table includes a searchable register identifier field containing a plurality of register identifiers, each corresponding to one of said set of data.

14. The system of claim 13, wherein said advance data table includes a register identifier valid bit associated with each of said plurality of register identifiers.

15. The system of claim 14, wherein said register identifier valid bit is set invalid when an instruction other than the instruction corresponding to said register identifier targets the target register that said register identifier identifies.

16. The system of claim 14, wherein a first data in said set of data that results from a first instruction may be used by a second instruction during speculative execution when a first register associated with said first data is a source register of said second instruction and the register identifier valid bit of said first register is set valid.

17. A processor, comprising:
   means for buffering a plurality of instructions in an instruction buffer supporting run-ahead execution of the plurality of instructions;
   storage means for storing a set of data resulting from said plurality of instructions during the run-ahead execution, wherein the storing of the set of data is responsive to a cache miss;
   means for deriving a valid bit for each of said set of data from poisoned status of source registers of the corresponding instruction;
   means for supplying said set of data to at least one of said plurality of instructions during re-execution, each of said set of data intended for a target register of one of said plurality of instructions; and means for issuing more than one instruction in a single clock cycle during the re-execution when data required by said more than one instruction is either in said table with valid bit being set valid or otherwise available.

18. The processor of claim 17, wherein said storage means includes means for storing a register identifier for a target register associated with each of said set of data.

19. The processor of claim 18, further comprising means for setting a register identifier valid bit invalid when an instruction other than the instruction corresponding to said register identifier targets the target register that said register identifier identifies.

20. The processor of claim 18, further comprising means for consuming a first data in said set of data that results from a first instruction by a second instruction during speculative execution when a first register associated with said first data is a source register of said second instruction and the register identifier valid bit of said first register is set valid.

* * * * *